Feb. 2, 1960        A. T. VAN URK        2,923,057

SHEAR PLATE AND CUTTER ARRANGEMENT FOR A DRY SHAVER

Filed Oct. 1, 1954

*INVENTOR.*
AREND T. VAN URK

BY

*AGENT*

2,923,057

SHEAR PLATE AND CUTTER ARRANGEMENT FOR A DRY SHAVER

Arend Thomas Van Urk, Eindhoven, Netherlands, assignor, by mesne assignments, to North American Philips Company, Inc., New York, N.Y., a corporation of Delaware Application October 1, 1954, Serial No. 459,762

Claims priority, application Netherlands October 5, 1953

2 Claims. (Cl. 30—43)

This invention relates to an improved dry-shaving apparatus in which a thin shear plate having a plurality of apertures therein is mounted in cooperative relationship with a cutting member which traverses the inner surface of said shear plate.

A principal object of this invention is to provide a construction for a dry-shaver having an improved cooperative relationship between the shear plate and the cutting member.

Further objects of this invention will appear as the specification progresses.

In accordance with this invention, a dry-shaver is provided in which an apertured shear plate is mounted in cooperative relationship with a cutting member, the shear plate being provided with means to prevent a rotating movement thereof but permitting limited axial translating movement. The shear plate is movable parallel to itself in a direction toward the cutting member.

An advantage of the parallel movement of the shear plate is that an accurate finish of the cutting edges of the blades and an accurate cooperation between cutting member and shear plate is maintained. Even if the cutting edges of the blades are not uniformly hard, a tendency toward uneven wear is reduced since the contact between cutting member and shear plate is established mainly by the harder parts of the cutting edges. Moreover, the operator can regulate the pressure exerted by the cutting member on the shear plate by varying the pressure of the shaver on his skin. In order to obtain a satisfactory shave, a heavy beard, for example, will require a heavier pressure of the shear plate on the cutting member than a light beard. The invention may, moreover, be applied with advantage to a dry-shaving apparatus in which the shear plate is flexible f.i. constituted by a very thin metal plate stretched on its supporting body. A further advantage of the invention is that the plate is prevented from being bent because it is supported by the edges of the cutting member which must also be flat.

Figure 1:
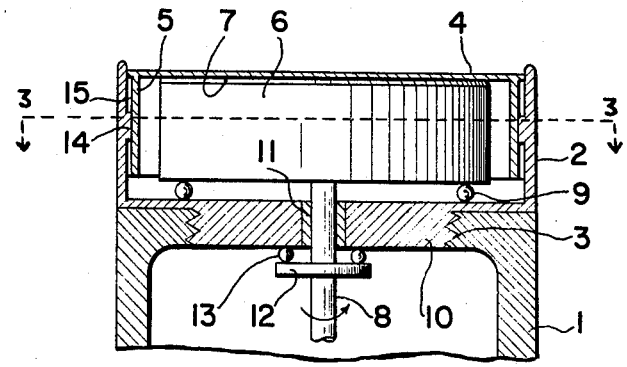
Figure 2:
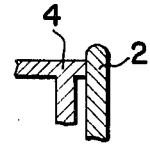

The invention will now be described with reference to the accompanying drawing in which Fig. 1 is a partial cross-sectional view of part of a dry-shaving apparatus according to the invention showing the cooperative relationship of a shear plate and a rotary cutting member, and Fig. 2 is an enlarged partial cross-section view of the right hand corner of the shear plate and housing shown in Fig. 1.

Figure 3:
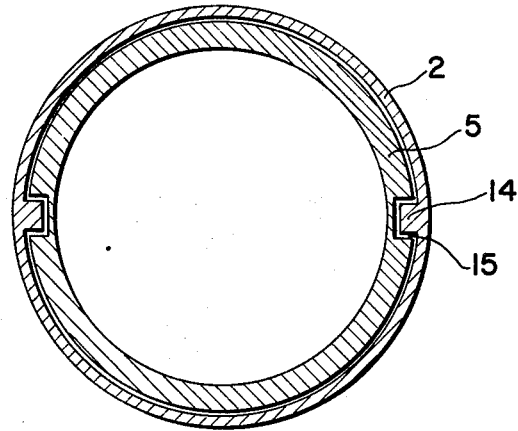

Fig. 3 is a cross-section view taken along the lines 3—3 of Fig. 1.

Referring to Fig. 1, a body 1 of a dry-shaving apparatus is secured to cylindrical housing member 2 by means of screw thread 3. A shear plate 4, having apertures (not shown) to pass the hair is also provided with a tubular supporting member 5 of cylindrical cross-sectional area. The tubular supporting member 5 fits accurately in the member 2, so that the shear plate 4 is displaceable transverse to the plane of the shear plate 4. A cutting member 6 in the shape of a circular disc is provided on the upper side with cutting edges 7, which are constituted by more or less radial ridges. The cutting member 6 is rotated by means of a shaft 8 of a device not shown. The cutting member 6 and the associated shaft 8 are journalled in a manner such that only the rotary movement required for the cutting effect can be performed while lateral movement of the cutting member 6 and the shaft is substantially prevented. The cutting member 6 is therefore supported on the bottom side by means of ball bearings 9 on a thickened portion 10 of the cylindrical housing member 2 while the shaft 8 is journalled in a bearing sleeve 11 also held by the thickened portion 10 of housing 2. The shaft 8 has a shoulder member 12, by means of which an upward, vertical motion of the shaft is prevented by ball bearings 13 located between the shoulder member 12 and the thickened portion 10.

The shear plate 4 is prevented from rotating with the cutting member 6 since the inner side of member 2 is provided with lugs 14, which are located, in the mounted condition of the apparatus, in slots 15 of the member 5. The slots 15 extend in an axial direction, i.e. in the direction in which the shear plate must be movable as illustrated in Fig. 3. Thus, the shear plate 4 is coupled to the housing member 2.

In the modified embodiment shown in Fig. 2 a body 21 has mounted thereon a support member 22 of substantially rectangular cross-sectional area and having a guide member 22 integral therewith. A shear plate 23 having slots 24 to pass the hair, is provided with guide flange 25 of rectangular sectional area. The guide flange 25 fits accurately around guide member 22 so that the shear plate 23 is displaceable along its major axis. A cutting member 26 is provided on the upper side with cutting edges 27 formed by transverse ridges. The cutting member 26 is driven by a device not shown in the direction of the arrows 28. The cutting member 26 is journalled in a manner such that only the reciprocatory movement required for the cutting operation can be performed. The cutting member 26 is mounted in engagement with supports 29 while a slot 30 is provided between the supports 29 in which a key 31 of the cutting member is displaceable and provides the rectilinear guide.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

I claim:

1. A dry shaver comprising a housing having a lug thereon, an apertured shear plate provided with a tubular supporting member with a slot, a cutting member positioned in said housing and having cutting surfaces adjacent to the inner surfaces of said shear plate, said lug and slot interfitting to form a coupling device coupling said shear plate and tubular supporting member to said housing but permitting movement of said shear plate and tubular supporting member in one plane parallel to the longitudinal axis of said housing, means coacting with said cutting member for preventing movement of said cutting member toward said shear plate, and said cutting member being adapted to be moved across the apertures of said shear plate by appropriate means.

2. A dry shaver as claimed in claim 1 further comprising a thickened portion of said housing extending substantially perpendicular to said housing, and a bearing inserted in said housing for guiding the movement of said cutting member.

(References on following page)

References Cited in the file of this patent

UNITED STATES PATENTS

| | | |
|---|---|---|
| 1,757,978 | Schick | May 13, 1930 |
| 2,167,833 | Gold | Aug. 1, 1939 |
| 2,265,305 | Nyhagen | Dec. 9, 1941 |
| 2,283,834 | Van Dam et al. | May 19, 1942 |
| 2,355,672 | Page | Aug. 15, 1944 |
| 2,359,880 | Scully | Oct. 10, 1944 |
| 2,369,198 | Wyse | Feb. 13, 1945 |
| 2,370,331 | Susunaga | Feb. 27, 1945 |
| 2,461,858 | Towers | Feb. 15, 1949 |
| 2,472,853 | Lorenz | June 14, 1949 |
| 2,499,249 | Jay | Feb. 28, 1950 |
| 2,565,828 | Vivie | Aug. 28, 1951 |
| 2,595,693 | Norwood | May 6, 1952 |

FOREIGN PATENTS

| | | |
|---|---|---|
| 361,420 | Italy | July 20, 1930 |
| 407,221 | Italy | Sept. 25, 1944 |
| 913,779 | France | June 3, 1946 |